(12) United States Patent
Sung

(10) Patent No.: US 6,994,581 B2
(45) Date of Patent: Feb. 7, 2006

(54) BACK CARTRIDGE COUPLING STRUCTURE

(75) Inventor: Chi-Min Sung, Taipei Hsien (TW)

(73) Assignee: Mitac International Corp., Hsinchu (TW)

( * ) Notice: Subject to any disclaimer, the term of this patent is extended or adjusted under 35 U.S.C. 154(b) by 13 days.

(21) Appl. No.: 10/920,172

(22) Filed: Aug. 18, 2004

(65) Prior Publication Data

US 2005/0048819 A1 Mar. 3, 2005

Related U.S. Application Data

(63) Continuation of application No. 10/647,216, filed on Aug. 26, 2003, now abandoned.

(51) Int. Cl.
H01R 13/62 (2006.01)

(52) U.S. Cl. ........................................ 439/347; 439/500
(58) Field of Classification Search ................. 439/342, 439/345, 347, 366, 299, 157, 10, 500
See application file for complete search history.

(56) References Cited

U.S. PATENT DOCUMENTS 5,902,141 A * 5/1999 Iwahori ...................... 439/157
6,010,351 A * 1/2000 Kuboto ....................... 439/347
6,233,141 B1 * 5/2001 Lee et al. .................... 439/342

* cited by examiner

Primary Examiner—Renee Luebke
(74) Attorney, Agent, or Firm—Harness, Dickey & Pierce, PLC

(57) ABSTRACT

A back cartridge coupling structure is used in a handheld data processor comprising a body and a back cartridge. A connecter slot disposed at the coupling face of the body corresponds to a connecter disposed on the coupling face of the back cartridge. The coupling structure comprises a seizing element disposed on the coupling face of the body, and an outer lining, corresponding to the seizing element and disposed at one end of the back cartridge. The outer lining can be moved in parallel relative to the coupling face of the back cartridge. When pressing the two coupling faces toward each other face to face, the connector is inserted into the connecter slot and the outer lining is slid relative to the coupling face of the back cartridge. The outer lining is held in place by the seizing element to couple the body and the back cartridge. Thereby, both of the surfaces will not be scratched.

15 Claims, 7 Drawing Sheets

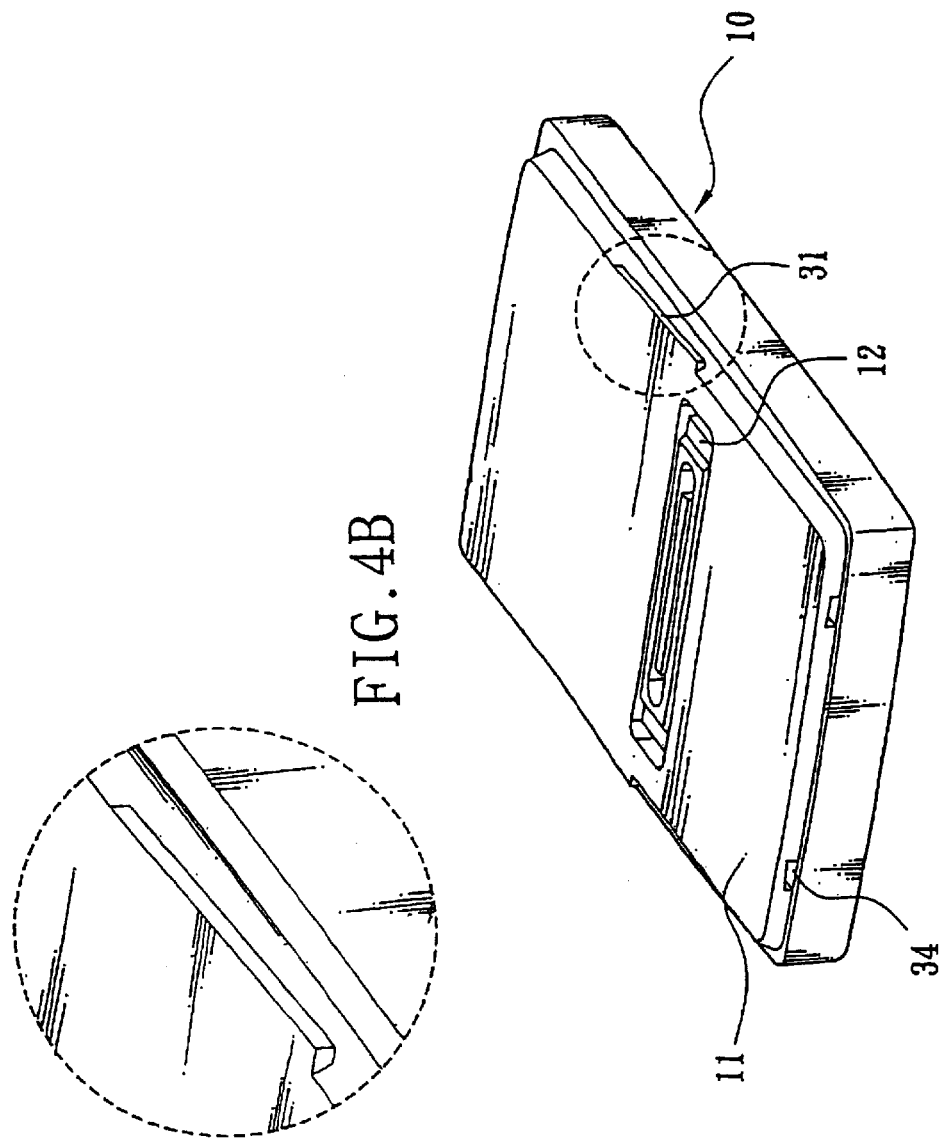

BACK CARTRIDGE COUPLING STRUCTURE

CROSS-REFERENCE TO RELATED APPLICATIONS

This is a continuation application of U.S. application Ser. No. 10/647,216 filed on Aug. 26, 2003 now abandoned.

BACKGROUND OF THE INVENTION

1. Field of Invention

The present invention relates to a back cartridge structure, which is used in a handheld data processor, and more particularly to a back cartridge coupling structure that allows the body of the handheld data processor not to be scratched when the body and the back cartridge are jointed with each other.

2. Related Art

At present, the back cartridge is used to provide the handheld data processor with a sufficient electric power, it can be furnished a backup battery or other devices that can expand the function of the handheld data processor (such as CF, SD card receptacle module or wireless communication module). However, the coupling between the current back cartridge and the body of handheld data processor, such as Visor series products produced by Handspring, is achieved by an upward-faced connecter slot disposed in the body and a 90° projected, downward-faced connecter disposed on the back cartridge. The back cartridge must be slid face-to-face relative to the body in order for the connecter slot and connecter to be jointed when the back cartridge and the body are coupled. Therefore, the face of the back cartridge and the body will be scratched over a long period of time. Also, a relatively large gap must be maintained between the back cartridge and the body so that they can be slid smoothly. As a consequence, the back cartridge shakes easily after the coupling.

Therefore, it is important for us to invent a back cartridge coupling structure in order for the faces of the body of the handheld data processor and back cartridge not to scratch each other when they are coupled together.

SUMMARY OF THE INVENTION

The object of the invention is to provide a back cartridge coupling structure, preventing the faces of a back cartridge and the body from scratching each other by coupling the body and the back cartridge in a vertical direction.

The body of a handheld data processor comprises a connecter slot disposed at its coupling face thereof. A back cartridge comprises a connecter, corresponding to the connecter slot, disposed on the coupling face of the back cartridge. The coupling structure comprises a seizing element and outer lining. The seizing element is disposed on the coupling face of the body, and the outer lining, corresponding to the seizing element, is disposed at one end of the back cartridge and can be moved in parallel relative to the coupling face of the back cartridge. First, the two coupling faces of the body and the cartridge need to be pressed face to face in a vertical direction when coupling the body and the back cartridge together so that the connecter can be inserted into the connecter slot (it also means that the back cartridge is placed on the body). Then, the outer lining is slid in parallel relative to the coupling face of the back cartridge. The body and back cartridge are coupled together when the back cartridge is held by the seizing element.

The scope of applicability of the present invention will become apparent from the detailed description given hereinafter. However, it should be understood that the detailed description and specific examples, while indicating preferred embodiments of the present invention, are given by way of illustration only. Various changes and modifications within the spirit and scope of the invention will become apparent to those skilled in the art from this detailed description.

BRIEF DESCRIPTION OF THE DRAWINGS

The present invention will become more fully understood readily from the detailed description given hereinbelow in an illustrative manner, wherein:

FIGS. 4A and 4B are schematic views of another embodiment of the present invention.

DETAILED DESCRIPTION OF THE INVENTION

Figure 1:
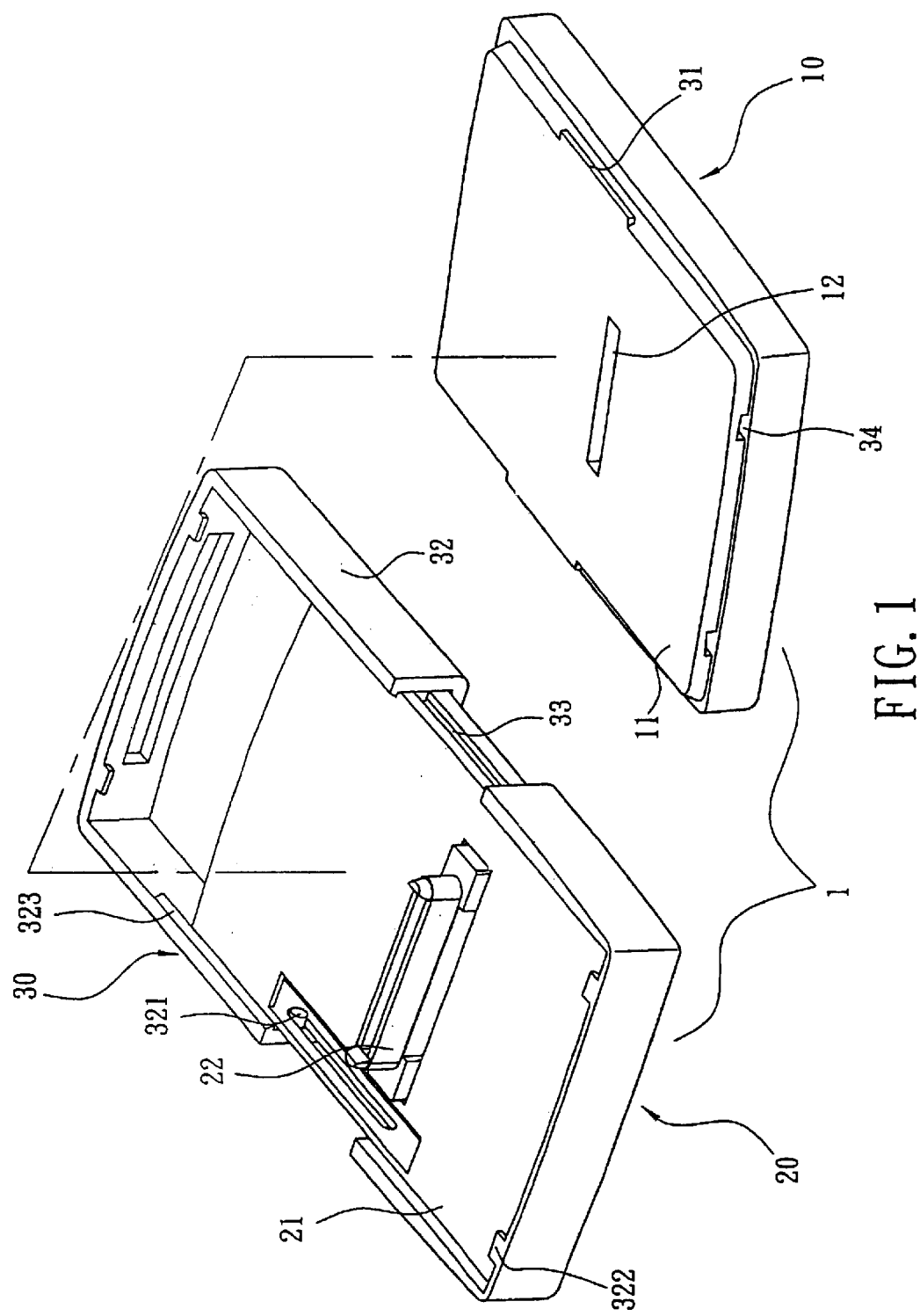
FIG. 1 is an explosive view of a preferred embodiment of the present invention.

Please refer to FIG. 1, a back cartridge coupling structure 30 according to the invention is used in handheld data processor 1, which comprises a body 10 and back cartridge 20.

The body 10 comprises a coupling face 11 and a connecter slot 12; the connecter slot 12 is disposed in the coupling face 11.

The back cartridge 20 comprises a coupling face 21 and a connecter 22; the connecter 22, corresponding to the connecter slot 12 of the body, is disposed on the coupling face 21. The connecter 22 and connecter slot 12 can be jointed together when the body 10 is coupled to the back cartridge 20.

Figure 2:
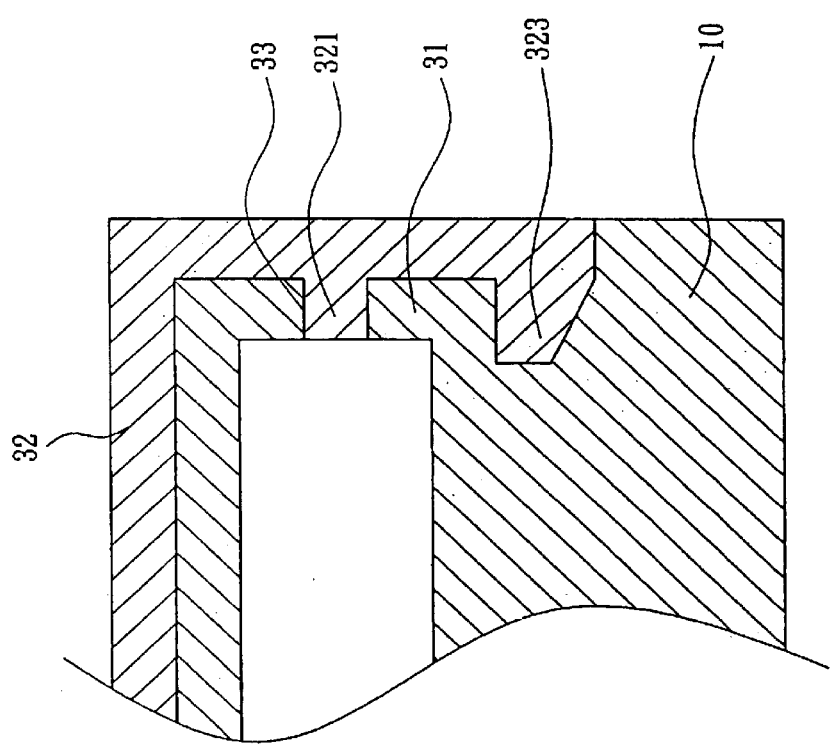
FIG. 2 is a cross-sectional view of a preferred embodiment of the present invention, showing the sliding clasp hooking up the seizing element when the body and the back cartridge are coupled together.

The coupling structure 30 comprises a seizing element 31, an outer lining 32, sliding groove 33 and detaining holes 34. The seizing element 31 is disposed on the coupling face 11 of the body 10 and is parallel to the edge of the coupling face 11 of the body 10. The outer lining 32, corresponding to the seizing element 31, is disposed at one end of the back cartridge 20 and comprises a projecting column 321, buttons 322 and a sliding clasp 323. The sliding clasp 323 is disposed corresponding to one end of the seizing element 31 in order to hook up this end of seizing element 31 to prevent the back cartridge from falling down in the direction opposite to this end after the body 10 is coupled with the back cartridge 20, as shown in FIG. 2. The sliding groove 33 corresponding to the projecting column 321 is disposed in the back cartridge 20 so as to allow the projecting column 321 to be slid in the groove 33. Therefore, the outer lining 32 can be slid in parallel relative to the coupling face 21 of the back cartridge 20. The detaining holes 34 corresponding to the buttons 322 are disposed in the body 10 so that the buttons 322 can fit into the detaining holes 34 when the body 10 is coupled to the back cartridge 20.

Figure 3A:
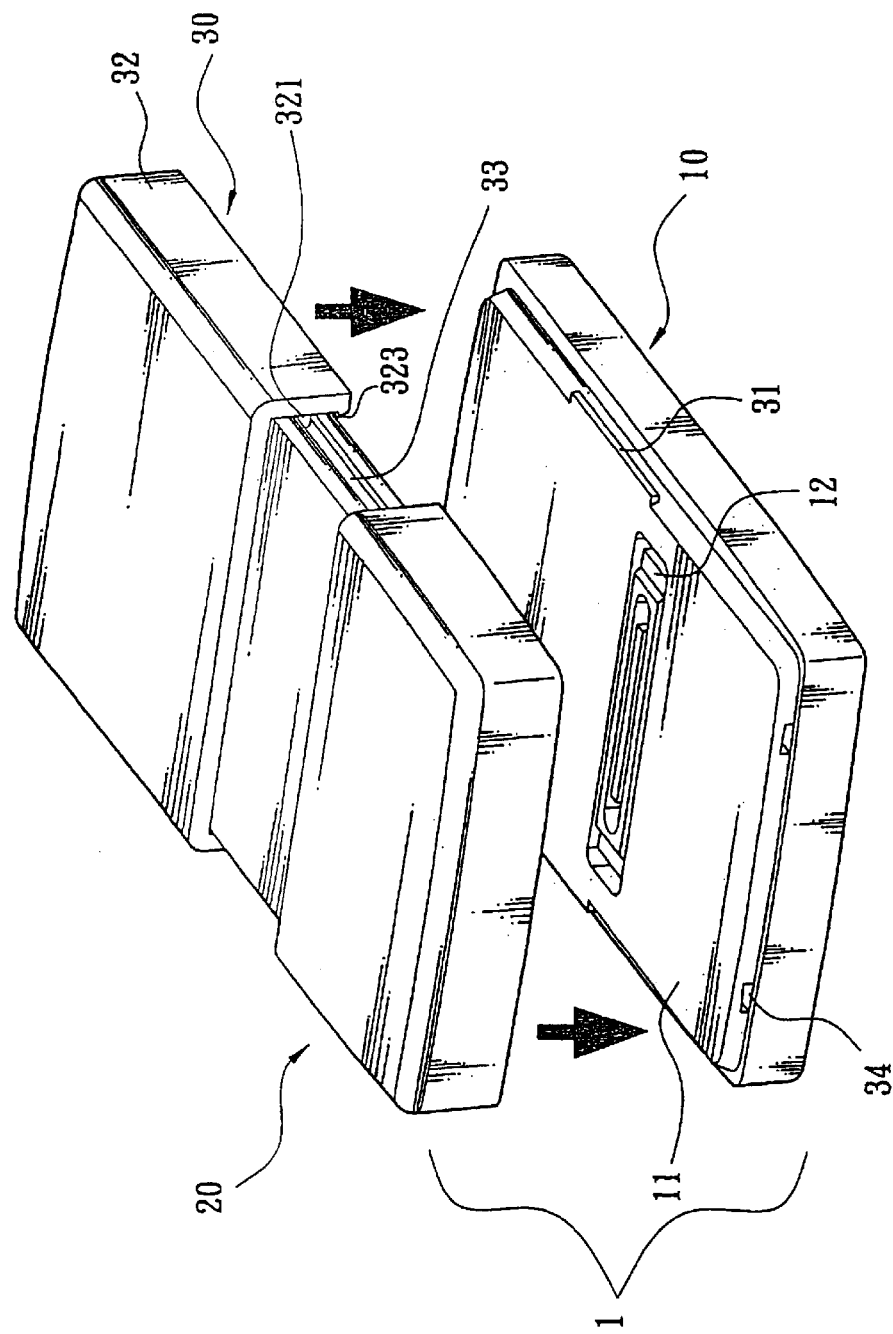
FIGS. 3A, 3B and 3C are schematic views of a preferred embodiment, showing the procedure of the coupling of the body and the back cartridge.
Figure 3B:
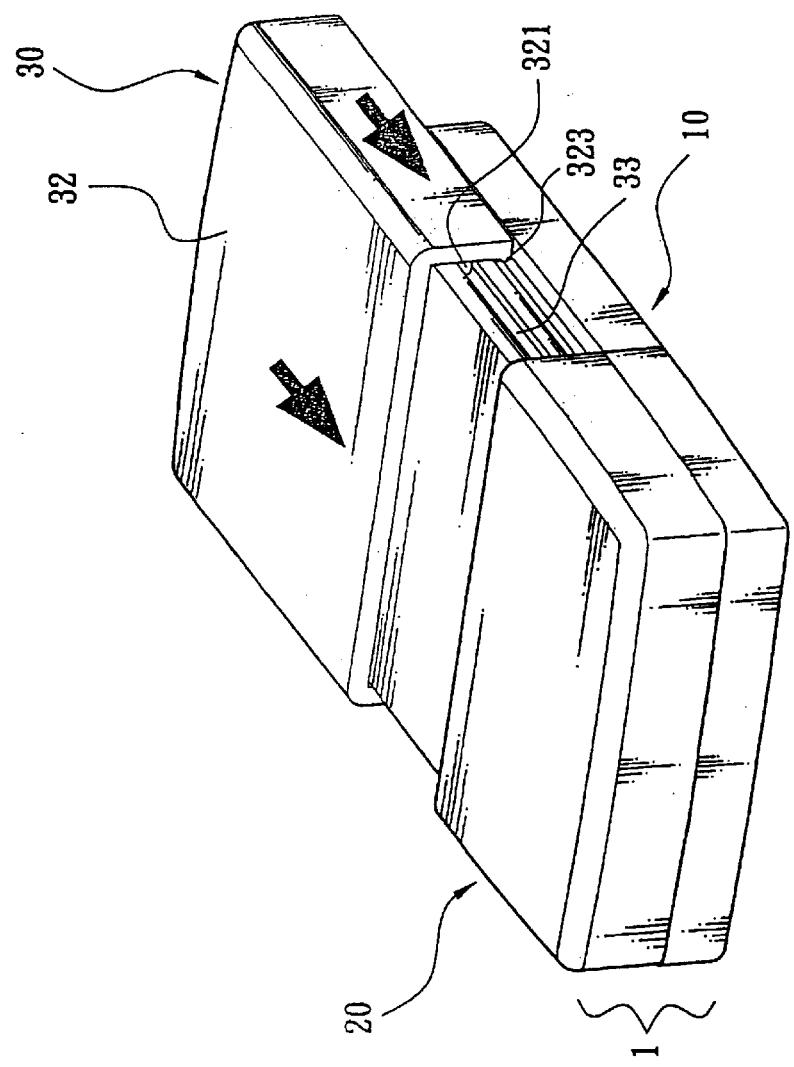
Figure 3C:
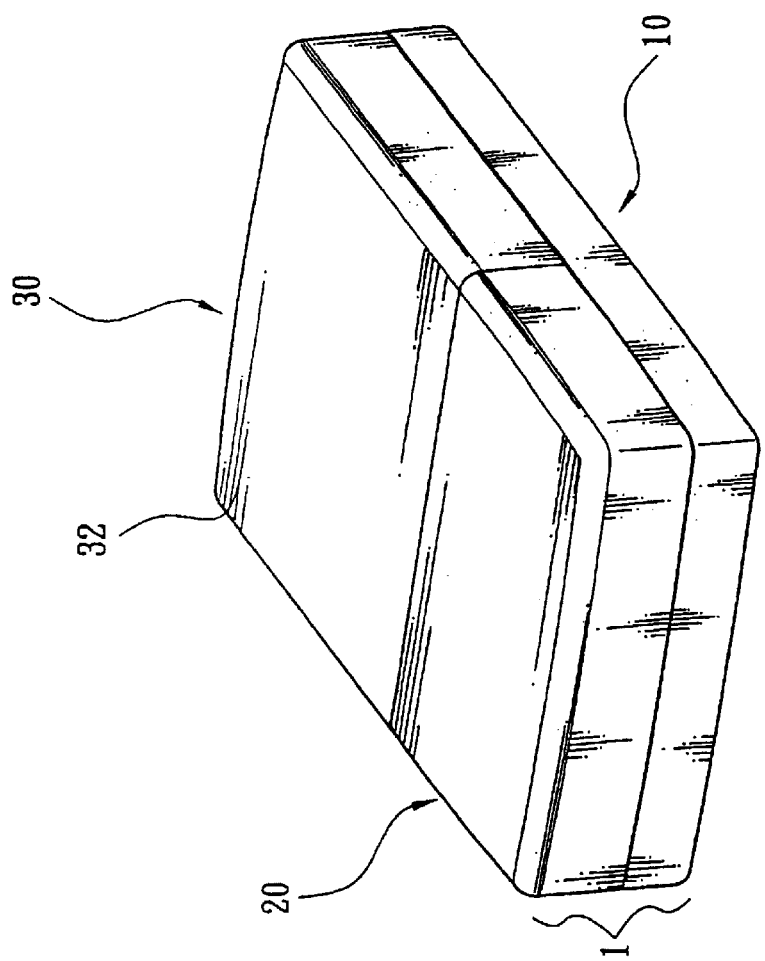
Figures 5A, 5B:
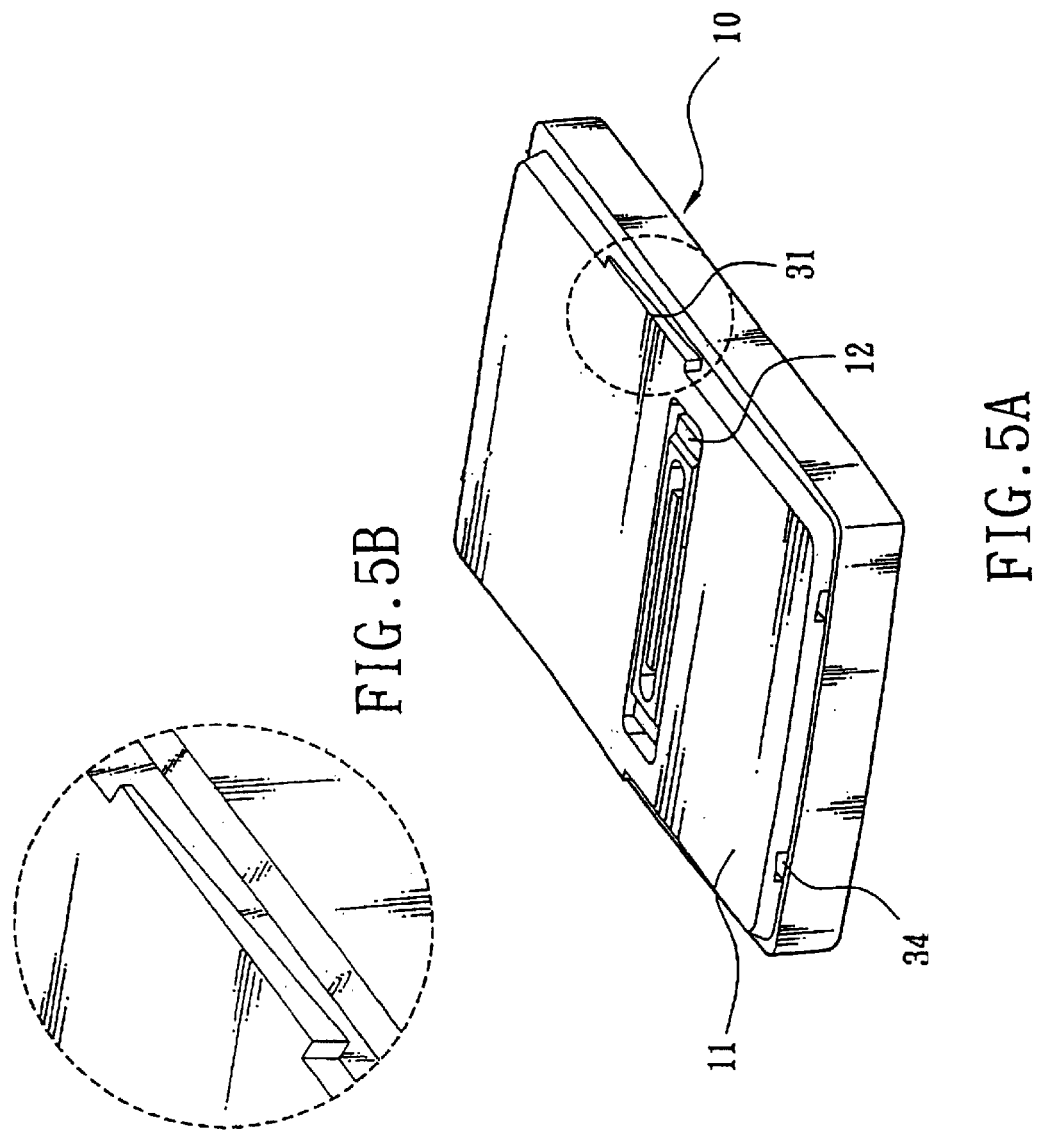
FIGS. 5A and 5B are schematic views of another embodiment of the present invention.

As shown in FIGS. 3A, 3B and 3C, first, the two coupling faces 11, 21 of the body 10 and the back cartridge 20 are pressed toward each other face to face in a vertical direction when they are coupled together so that the connecter 22 can be inserted into the connecter slot 12 (it also means that the back cartridge 20 is placed on the body 10). Then, the outer lining 32 is slid in parallel relative to the coupling face 21 of the back cartridge 20 (the projecting column 321 is slid along the sliding groove 33). The outer lining 32 is held in place by the seizing element 31 when it is slid so as to increase the tightness of the coupling of the body 10 and back cartridge 20. The sliding clasp 323 hooks up one end of the seizing element 31, and the buttons 322 fit into the detaining holes 34 so as to couple the body 10 and back cartridge 20. The arrangement of the buttons 322 and detaining holes 34 can increase the tightness of the coupling.

Furthermore, refer to FIGS. 4A, 4B, 5A and 5B, the end of the seizing element 31 that first comes into contact with the outer lining 32 is thinner than the other end of the seizing element 31 that last comes into contact with the outer lining 32 (it is also the time when the coupling of the body 10 and back cartridge 20 is completed). Such kind of the design can be used in the profile of the seizing element 31 whether it has the thinner end and the thicker end in a direction parallel or perpendicular to the coupling face 11 so as to increase the tightness of the coupling of the body 10 and back cartridge 20.

The coupling face 11 does not have to be at the back face of the body 10. It may be at the front or in other positions.

The back cartridge coupling structure according to the present invention doesn't cause the surfaces of the back cartridge and body to be scratched, because the back cartridge is pressed toward the body, face to face in a vertical direction while coupling. Furthermore, it is convenient to use only the outer lining according to the present invention to couple the back cartridge and body tightly.

The exemplary embodiments of the present invention have been described in an illustrative manner. Many modifications and variations of the exemplary embodiments of the present invention are possible in light of the above teachings. Therefore, it is to be understood that within the scope of the appended claims, the exemplary embodiments of the present invention may be practiced otherwise than as specifically described above.

What is claimed is:

1. A back cartridge coupling structure for coupling a body including a connector slot disposed in a coupling face of the body and a back cartridge in a handheld data processor, comprising:
   a connector corresponding to the connector slot and disposed on a coupling face of the cartridge;
   a seizing element disposed on and projected from a side edge of the coupling face of the body, wherein the seizing element is parallel to the side edge of the coupling face, the seizing element having a thinner end and a thick end in a direction parallel to the coupling face of the body; and
   an outer lining corresponding to the seizing element and disposed at one end of the back cartridge, being able to be slid parallel to the coupling face of the back cartridge and being held by the seizing element after the coupling face of the back cartridge is pressed toward the coupling face of the body, face to face in a vertical direction, wherein the outer lining first contacts the thinner end of the seizing element and then the thicker end to couple the body and the back cartridge.

2. The back cartridge coupling structure of claim 1, wherein the outer lining further comprises a sliding clasp corresponding to one end of the seizing element, hooking up the one end of the seizing element after the body is coupled with the back cartridge.

3. The back cartridge coupling structure of claim 1, wherein the outer lining further comprises a projecting column corresponding to a sliding groove of the back cartridge, whereby the outer lining can be slid parallel to the coupling face of the back cartridge when the projecting column is slid along the sliding groove.

4. The back cartridge coupling structure of claim 1, wherein the back cartridge further comprises a button corresponding to a detaining hole of the body, whereby the button can fit into the detaining hole when the body is coupled with the back cartridge.

5. A back cartridge coupling structure for coupling a body including a connector slot disposed in a coupling surface of the body and a back cartridge in a handheld data processor, comprising:
   a connector corresponding to the connector slot and disposed on a coupling face of the back cartridge;
   a seizing element disposed on the coupling face of the body and projected from a side edge of the coupling surface of the body, wherein the seizing element is parallel to the side edge of the coupling surface, the seizing element having a thinner end and a thicker end in a direction perpendicular to the coupling face of the body; and
   an outer lining corresponding to the seizing element and disposed at one end of the back cartridge, being able to be slid parallel to the coupling face of the back cartridge after the coupling face of the back cartridge is pressed toward the coupling face of the body, face to face in a vertical direction, wherein the outer lining is held by the seizing element to couple the body and the back cartridge.

6. The back cartridge coupling structure of claim 5, wherein the outer lining further comprises a sliding clasp corresponding to one end of the seizing element, hooking up the one end of the seizing element after the body is coupled with the back cartridge.

7. The back cartridge coupling structure of claim 5, wherein the outer lining further comprises a projecting column corresponding to a sliding groove of the back cartridge, whereby the outer lining can be slid parallel to the coupling face of the back cartridge when the projecting column is slid along the sliding groove.

8. The back cartridge coupling structure of claim 5, wherein the back cartridge further comprises a button corresponding to a detaining hole of the body, whereby the button can fit into the detaining hole when the body is coupled with the back cartridge.

9. A back cartridge coupling structure for coupling a body including a connector slot disposed in a coupling face of the body and a back cartridge in a handheld data processor, comprising:
   a connector corresponding to the connector slot and disposed on a coupling face of the back cartridge;
   a seizing element disposed at the coupling face of the body;
   an outer lining corresponding to the seizing element and disposed at one end of the back cartridge, being able to be slid parallel to the coupling face of the back cartridge after the coupling face of the back cartridge is pressed toward the coupling face of the body, face to face in a vertical direction, wherein the outer lining is held in place by the seizing element to couple the body and the back cartridge, the outer lining further comprising a projecting column corresponding to a sliding groove of the back cartridge to let the outer lining be slid parallel to the coupling face of the back cartridge when the projecting column is slid along the sliding groove.

10. The back cartridge coupling structure of claim 9, wherein the outer lining further comprises a sliding clasp corresponding to one end of the seizing element, hooking up the one end of the seizing element after the body is coupled with the back cartridge.

11. The back cartridge coupling structure of claim 9, wherein the seizing element is projected from and in parallel with a side edge of the coupling face of the body.

12. The back cartridge coupling structure of claim 9, wherein the back cartridge further comprises a button corresponding to a detaining hole of the body, whereby the button can fit into the detaining hole when the body is coupled with the back cartridge.

13. A back cartridge coupling structure for coupling a body including a connector slot disposed in a coupling face of the body and a back cartridge in a handheld data processor, comprising:

a connector corresponding to the connector slot and disposed on a coupling face of the back cartridge;

a seizing element, disposed at the coupling face of the body; and an outer lining corresponding to the seizing element and disposed at one end of the back cartridge, being able to be slid parallel to the coupling face of the back cartridge after the coupling face of the back cartridge is pressed toward the coupling face of the body, face to face in a vertical direction, wherein the outer lining is held by the seizing element to couple the body and the back cartridge, the outer lining further comprising a button corresponding to a detaining hole of the body, whereby the button can fit into the detaining hole when the body is coupled with the back cartridge.

14. The back cartridge coupling structure of claim 13, wherein the outer lining further comprises a sliding clasp corresponding to one end of the seizing element, hooking up the one end of the seizing element after the body is coupled with the back cartridge.

15. The back cartridge coupling structure of claim 13, wherein the seizing element is projected from and parallel to a side edge of the coupling face of the body.

* * * * *